Patented Apr. 4, 1939

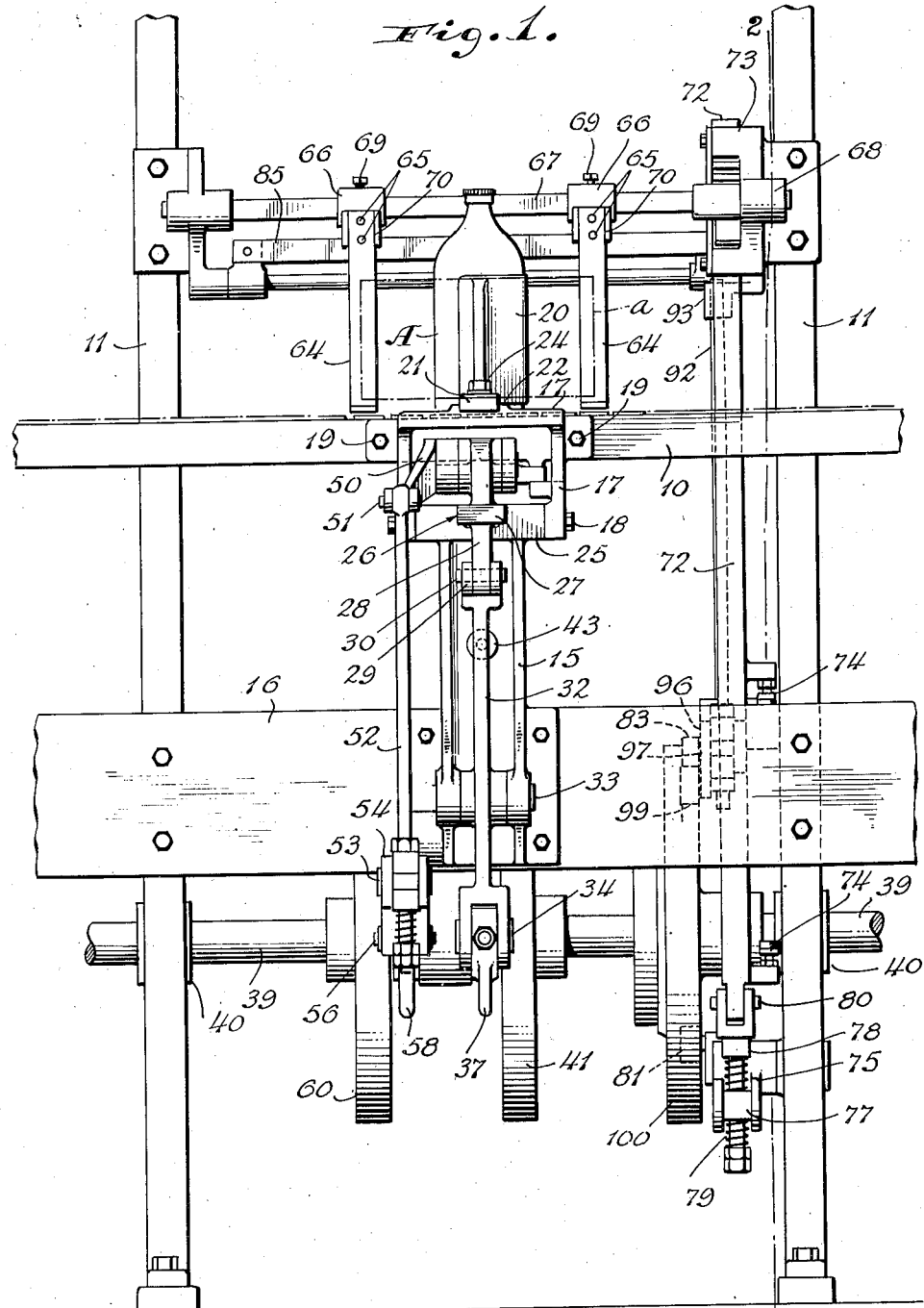

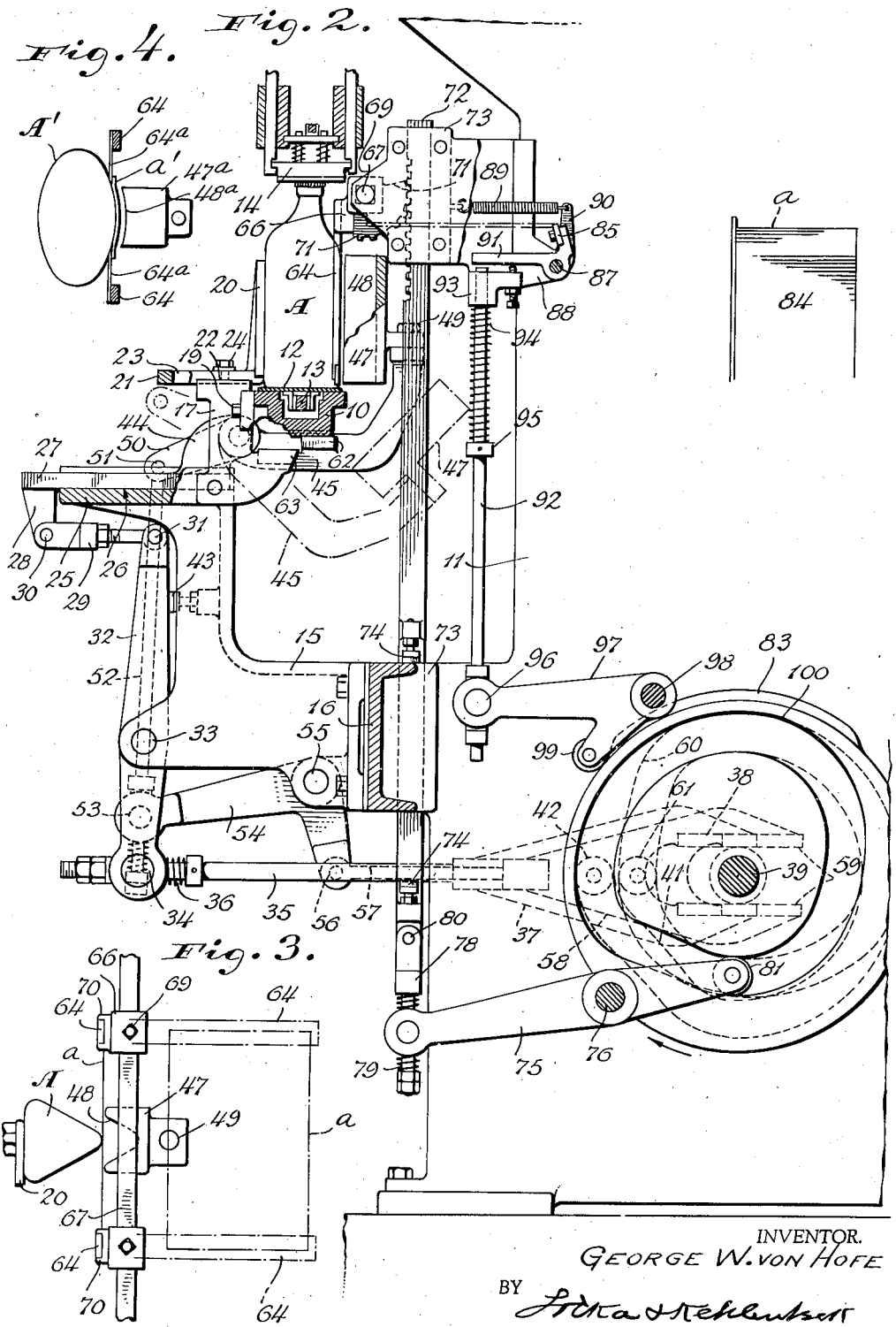

2,153,355

UNITED STATES PATENT OFFICE 2,153,355

MECHANISM FOR APPLYING LABELS

George W. von Hofe, Bound Brook, N. J., assignor to New Jersey Machine Corporation, Hoboken, N. J., a corporation of New Jersey Application March 5, 1938, Serial No. 194,059

23 Claims. (Cl. 216—55)

The invention relates to mechanisms for applying labels or their equivalent, and has for its object to provide a novel mechanism whereby labels or their equivalent, are transferred in an efficient and reliable manner into applying relation to the articles for which said labels or their equivalent are designed, and whereby said labels or their equivalent are adhesively affixed on said articles either as an initial, partial application, or as a complete application dependent upon the nature, dimensions and type of the articles and labels or their equivalent.

Other more specific objects will appear hereinafter and the features of novelty will be pointed out in the claims.

In the accompanying drawings, which illustrate examples of the invention, without defining its limits, Fig. 1 is a front elevation of the novel mechanism; Fig. 2 is a section on the line 2—2 of Fig. 1; Fig. 3 is a fragmentary plan view, and Fig. 4 is a detail view showing another form of the invention.

In the example selected for purposes of illustration and description, the novel mechanism is designed for embodiment in a labeling machine in which the articles to be labeled, as exemplified by bottles A, are transported over a predetermined path preferably in intermittent steps followed by rest periods of predetermined duration. As shown, the aforesaid predetermined path may be defined by a channeled rail 10 suitably mounted upon a conventional frame 11 and serving as a support for a movable conveyor 12 on which the bottles A or other articles are located during transport. The conveyor 12 may be operated intermitently in any convenient manner, as for instance by means of an actuating chain 13 movable lengthwise of the channel of the rail 10 and itself propelled intermittently in the desired manner by means of any customary operating agency. The bottles A or other articles, may be removably held in place upon the conveyor 12 in any convenient way as by means of suitably controlled clamping devices 14 movable in parallel relation to the conveyor 12 and in speed synchronism therewith in any suitable manner.

The novel mechanism which is located in operative relation to and at a convenient point of the previously mentioned predetermined path over which the articles A are transported, comprises a bracket 15 mounted upon a rail 16 suitably fixed in place on the frame 11, said bracket 15 preferably being of channeled form for the purpose to be more fully set forth hereinafter.

At its upper portion the bracket 15 carries a supporting yoke 17 secured in place for instance by screws 18 and preferably also fastened to the rail 10 by screws 19 or the like, as shown in Figs. 1 and 2. The yoke 17 serves as a support for a stop 20 which, in the preferred arrangement is adjustable in directions transverse to the path of movement of the conveyor 12. As shown, the stop 20 constitutes part of a member 21 which is slidably mounted between guide ribs 22 provided on the yoke 17 as illustrated in Fig. 1; the member 21 is formed with a slot 23 for the accommodation of a screw bolt 24 whereby the member 21 and with it the stop 20 are fixed in an adjusted position.

The bracket 15 further includes a guide plate 25 provided with a guideway 26 in which a carrier slide 27 is slidable for reciprocation therein for the purpose to be more fully described hereinafter. The slide 27 is arranged to be reciprocated in properly timed synchronism with the associated elements, and as shown, carries a lug 28 to which the forked end of a link 29 is pivotally connected at 30. The opposite end of the link 29 is pivotally connected at 31 with one end of a rocking lever 32 pivoted at 33 upon a projecting portion of the bracket 15.

Any suitable means may be provided for rocking the lever 32 on its pivot 33 to reciprocate the slide 27 in properly timed relation with the other parts of the mechanism. For instance, as shown, the opposite end of the lever 32 may be forked for the accommodation of a pivot pin 34 in which an operating rod 35 is yieldingly mounted under the influence of a spring 36; the operating rod 35 in the illustrated example forms part of or is suitably fastened to a bearing member 37 carrying bearing plates 38 located upon opposite sides of and in engagement with an operating shaft 39 so as to be pivotally and slidably supported thereby. The shaft 39 is rotatably mounted in conventional bearings 40 on the frame 11 and has fixed thereon a cam 41 which co-operates with a roller 42 journalled on the bearing member 37, to actuate the rod 35 and to thereby rock the lever 32 on its pivot 33. To arrest the reciprocating movements of the slide 27 in one direction, a suitable stop 43 may be provided, and preferably is adjustably mounted in any convenient manner for instance in the channel of the bracket 15, so as to be engaged by the lever 32 as shown in Fig. 2.

The slide 27 is provided with a lug 44 on which an arm or member 45 is pivotally mounted by means of a pivot pin 46, the latter and said arm 45 being connected with each other to move in unison. The arm or member 45 at its free end carries a labeling device 47 which is shaped for proper co-operation with the articles to be labeled, and in the illustrated example accordingly includes a converging recess 48 dimensioned to fit the apex portions of the triangular bottles A selected to exemplify said articles, as illustrated in Fig. 3. To permit labeling devices 47 of different types to be readily substituted for each other, said devices 47 are preferably removably fastened in place on the arm 45 as for instance by means of a screw bolt 49.

In the operation of the novel mechanism, the pin 46 is rocked on the lug 44 to swing the arm 45 and with it the labeling device 47 from the normal inoperative position shown by dotted lines in Fig. 2 into operative relation to the bottle A or its equivalent as shown by solid lines in Fig. 2. The means whereby this is accomplished may be of any suitable character and as illustrated in the drawings, may consist of a lever 50 fixed upon the pin 46 and pivotally connected at 51 with a link 52; the latter is pivotally, and preferably yieldingly, connected at 53 with one arm of a bell-crank lever 54 pivotally mounted at 55 upon a lug carried by the rail 16 or upon a suitable portion of the bracket 15 as illustrated in Fig. 2. The other arm of the bell-crank lever 54 is pivotally connected at 56 with an operating member 57 which in turn is secured to or forms part of a bearing member 58 provided with bearing plates 59 located upon opposite sides of and in engagement with the shaft 39 so as to be supported and guided thereby. A cam 60 of suitable type is fixed upon the shaft 39 and co-operates with a roller 61 journalled on the bearing member 58 to rock the bell-crank lever 54 and through the medium of the link 52, to correspondingly rock the pin 46 and thereby swing the arm 45 and the labeling device 47 in a manner to be more fully set forth hereinafter. The arm 45 is provided with a stop 62 which co-operates with the rail 10 to arrest the swinging movement of said arm 45 in one direction; the stop 62 is further adapted to co-operate with a projection 63 fixed upon the bracket 15 to lock the arm 45 against pivotal movement during one operative movement of the labeling device 47 as will be explained more in detail further on in the description.

In addition to the parts so far described, the novel mechanism includes means for transferring the labels into applying relation to the bottles or other articles A. The transfer means, in the form shown in the drawings, comprises two carrying members 64 located in predetermined spaced parallel relation to each other as illustrated in Fig. 1; in the preferred arrangement, the members 64 are detachably fastened, as by means of screws 65, upon brackets 66 fixed upon a rock shaft 67 rotatably mounted in suitable bearings 68 upon the frame 11. Throughout its intermediate portion, the shaft 67 is preferably of rectangular or equivalent cross-section and the brackets 66 are slidably mounted thereon so as to be adjustable at will lengthwise of said shaft 67; the brackets 66 may be fixed in adjusted positions on the latter in any convenient manner as by set screws 69, and in addition are formed with suitable recesses 70 into which the ends of the members 64 are fitted as shown in Fig. 1. In any case, the members 64 occupy positions in predetermined relationship to the labeling device 47, stop 20 and associated elements, so that when the bottles or other articles A reach the label applying station and remain temporarily at rest thereat, the members 64 will operate in predetermined relation thereto.

In the illustrated example, the members 64 are operated from the horizontal label receiving position shown by dotted lines in Fig. 2 to the vertical label delivery position illustrated by solid lines in Figs. 1 and 2. In the latter position, the label $a$ transferred by the members 64 from the receiving position to the delivery position is located in symmetrical relation to the bottle A and extends equidistantly in opposite directions from the apex edge thereof as shown in Figs. 1 and 3; in such case, the label $a$ will be folded over said apex edge and into surface engagement with the side surfaces of the bottle A in the operation of applying said label $a$ thereto. If the labels $a$ are to be otherwise applied to the bottles or other articles A, the members 64 will be correspondingly positioned with respect to said articles, so as to present the labels $a$ in the proper applying relation to said bottles or other articles A.

For the purpose of operating the members 64 in the intended manner, the shaft 67 carries a toothed segment 71 arranged in mesh with a toothed rack 72 slidably mounted in guide-boxes 73 suitably mounted on the frame 11. In the illustrated example, the rack 72 is reciprocated vertically and is provided with preferably adjustable stops 74 adapted, by engagement with the rail 16 to arrest the movement of said rack 72 and to thereby determine the label receiving and label delivery portions of the members 64 in the manner indicated in Fig. 2. By suitably adjusting the upper stop 74, the carrying members 64 may automatically be brought to angular label delivery positions instead of the vertical position shown in Figs. 1 and 2; this arrangement accordingly enables the members 64 to bring the labels $a$ to applying positions in which said labels $a$ are in approximate surface parallelism with the surfaces for which they are intended. The illustrated means whereby the rack 72 is vertically reciprocated comprises a rocking arm 75 pivoted at 76 upon the frame 11 and provided at its one forked end with a pivot pin 77 in which a link 78 is yieldingly slidable under the influence of oppositely acting springs 79; the link 78 in turn is pivotally connected at 80 with the rack 72. At its opposite end the arm 75 carries a roller 81 projecting into the cam groove 82 of a cam 83 fixed upon the shaft 39 and whereby the operation of the rack 72 and the segment 71 with the members 64 is effected.

In the type of labeling machine selected for purposes of illustration and description, successive terminal labels $a$ are removed in the well known way from the top of a suitably arranged stack 84 for instance by means of a suction head (not shown); each label $a$ carried by the suction head is transported thereby into registry with and finally deposited upon and in temporary adhesive connection with the members 64 while the latter are in the label receiving position shown by dotted lines in Fig. 2. In many of the existing labeling machines under discussion the successive labels $a$ receive a coating of adhesive subsequent to their removal from the stack 84 during the transfer thereby for delivery to the members 64. To resist the forces developed by the suction head or its equivalent, in the actual act of depositing said labels $a$ upon the members 64, it is desirable to support the latter against yielding when the deposit of the labels takes place. The novel mechanism accordingly includes a supporting rail 85 on which the free ends of the members 64 are arranged to rest when in the label receiving position as shown in Fig. 2. To provide for the shifting of the rail 85 to an inoperative position in timed synchronism with the operation of the members 64, said rail 85 is supported upon brackets 86 which are fixed upon a rock shaft 87 journalled in bearings 88 conveniently mounted on the frame 11 as illustrated in Fig. 2; a spring 89 is connected with a lever 90 fixed upon the shaft 87 and serves to yieldingly maintain the rail 85 in its operative position and to return it thereto.

A tripping means is provided for actuating the rail 85 in a manner to release the members 64 from the restraining action thereof in proper operative synchronism with associated elements. As shown the tripping means consists of a tripping member 91 which is fastened on the shaft 87 and projects over the upper end of a tripping rod 92 mounted for vertical movement in a guide bearing 93; a spring 94 bears with one end against the bearing 93 and with its other end against a collar 95 carried by the rod 92 and serves to maintain the latter in its normal position and to return it thereto. The tripping rod 92 is pivotally connected at 96 with one arm of a bell-crank lever 97 pivoted at 98 upon the frame 11 and having its other arm provided with a roller 99 arranged in rolling engagement with a cam 100 fixed upon the shaft 39; the spring 94, in addition to its other functions, serves to maintain the roller 99 in operative contact with the cam 100.

In actual practice, the labels in some instances are smaller than the surface of the article to which they are to be applied, as exemplified for instance in Fig. 4 which illustrates a bottle A' of oval form in cross-section and a label a' deposited upon one of the longer faces of said bottle A'. To present such labels a' in proper applying relation to the bottles A' the carrying members 64 are preferably extended inwardly toward each other and as shown may be provided with extensions 64ᵃ upon which the labels a' are deposited by the aforesaid suction head or its equivalent in the manner previously set forth herein. It will be noted in Fig. 4 that the labeling device 47ᵃ is provided with a concave recess 48ᵃ curved to fit the convex surface of the bottle A'; otherwise the associated mechanism may be the same as shown in Figs. 1, 2 and 3.

In describing the operation of the novel mechanism, it will be assumed that the carrying members 64 occupy the label receiving position illustrated by dotted lines in Fig. 2, and that the arm 45 and the label applying device 47 carried thereby are in the inoperative position shown by dotted lines in Fig. 2.

As the operation proceeds, a label a will be removed from the top of the stack 84 by the customary suction head or its equivalent, and transported thereby to a position above and in registry with the carrying members 64; as previously stated, a coating of adhesive may be applied to the label a before it reaches the aforesaid position. In any case, the label a is deposited upon the members 64 with the adhesive coated surface of the opposite end portions of said label a in temporary adhesive connection with said members 64. The suction head or its equivalent will then develop a return movement and the label a will remain upon the members 64 and will span the space between the same, as shown in Figs. 1 and 3. It will be noted that the free ends of the members 64 rest upon and are supported by the supporting rail 85 during the deposit of the label a thereon, and are accordingly prevented from yielding against forces developed by the suction head or its equivalent, as a result of the actual depositing operation.

When the label a has been deposited on the carrying members 64, the high portion of the cam 100 will act on the roller 99 in a manner to swing the bell-crank lever 97 and cause it to raise the tripping rod 92 against the tension of the spring 94. This operation of the rod 92 will be transmitted to the tripping member 91 and will actuate the latter to rock the shaft 87 in a direction to swing the supporting rail 85 toward the right in Fig. 2 to an inoperative supporting position; the carrying members 64 will accordingly be relieved of the restraining action of said rail 85.

At the proper moment the arm 75 will be rocked on its pivot 86 by the action of the cam groove 82 on the roller 81, and will move the rack 72 downwardly until the upper stop 74 engages the rail 16. This downward movement of the rack 72 serves to correspondingly actuate the segment 71 and consequently rocks the shaft 67 in a manner to swing the carrying members 64 and the label a carried thereby downwardly from the horizontal label receiving position to the vertical label delivery position shown by solid lines in Fig. 2.

At this stage the cam 60 by acting on the roller 61 shifts the operating member 57 to the right in Fig. 2 and rocks the bell-crank lever 54 on its pivot 55 in a direction to develop a downward pull on the link 52. This pull is transmitted to the lever 50 and thereby rocks the pin 46 in a direction to pivotally shift the arm 45 and the labeling device 47 carried thereby from the normal inoperative position shown by dotted lines in Fig. 2 to the operative position shown by solid lines therein; at this stage, the labeling device 47 is accordingly in operative relation to the bottle A as illustrated in Fig. 2. It will be understood that the intermittent operation of the conveyor 12 and associated clamping devices 14, operating in timed synchronism with the other parts of the mechanism, has meanwhile transported a bottle A to the position shown in Figs. 1 and 2, and that said bottle A remains at rest thereat during a rest period of sufficient duration to enable the mechanism to perform its several operations.

When the labeling device 47 has been adjusted to the solid line position shown in Fig. 2, it is located in spaced parallel relation to the stop 20 and at a distance from the bottle A as illustrated in Figs. 2 and 3. In this condition of the parts the stop 62 is in contact with the lower surface of the rail 10 and in co-operation therewith has served to arrest the upward swinging of the arm 45 to thereby accurately position the device 47 in the aforesaid relation to the bottle A.

It will be noted further that the labeling device is located behind the label a supported on the carrying members 64 and that said label a is therefore in position between the bottle A and the labeling device 47. As the operation of the mechanism continues, the cam 41 by acting on the roller 42 will develop a pull on the bearing member 37 and operating rod 35 toward the right in Fig. 2 which will be communicated to the lever 32. The latter accordingly will be rocked on its pivot 33 in a manner to swing its upper end toward the left in Fig. 2 and thereby cause the link 29 to correspondingly shift the carrier slide 27. The arm 45 and its labeling device 47 will partake of this movement of the slide 27 to the left and will shift said labeling device 47 into contact with the label $a$ carried by the members 64 at the time; as the operations of the device 47 continues, the opposite ends of the label $a$ will be withdrawn from said members 64, this being possible because the adhesive whereby said ends are temporarily connected with said members 64 has not yet fully set, and, by the action of the recess 48, said label $a$ will be folded over the apex edge of the bottle A and into surface contact with the diverging faces thereof to which said label $a$ adheres. The aforesaid shifting of the arm 45 and device 47 toward the left in Fig. 2 will correspondingly move the stop 62 which accordingly slides over and in engagement with the fixed projection 63 so that said arm 45 is locked against pivotal movement and the labeling device 47 is accurately and rigidly held in its operative path during the application of the label $a$ to the bottle A as described. As the device 47 operates to apply the label $a$ to the bottle A, the latter will be held in place on the conveyor 12 by the stop 20 which opposes the pressure developed by the applying device 47 during the aforesaid operative steps.

When the label $a$ has been applied to the bottle A as described, the slide 27 is moved in a return direction to restore the labeling device 47 to the position occupied thereby in Fig. 2 and to coincidentally shift the stop 62 out of engagement with the projection 63. At this stage the pin 46 is rocked in a reverse direction by the lever 50, link 52 and associated elements under the operative influence of the cam 60, to swing the arm 45 and its labeling device 47 downwardly from the solid line position in Fig. 2 to the inoperative position shown by dotted lines therein.

In properly timed relationship, the rack 72 is moved upwardly until the lower stop 74 engages the rail 16, to thereby correspondingly actuate the segment 71 and rock the shaft 67 in a return direction. As a result of this the carrying members 64 will be shifted back to the horizontal label receiving position illustrated by dotted lines in Fig. 2. As the members 64 are thus swung, they will engage the supporting rail 85 and pivotally actuate the same against the tension of the spring 89 which will snap said rail 85 beneath the free ends of the members 64 as soon as this is possible; it will be understood that the tripping rod 92 has meanwhile been returned to its normal lower position so as not to interfere with the described movements of the supporting rail 85.

At an appropriate period in these operations, the belt 12 and associated clamps 14 are actuated to advance the bottle A to which the label $a$ has been applied one step, and to bring the next succeeding bottle or equivalent article A into operative relation to the aforesaid mechanism whereupon the operations set forth are repeated.

In some instances the application of the label $a$ to the article A may be completely performed by the device 47 and require no further action, while in other cases the application of the label $a$ by the labeling device 47 may constitute a partial application; in such event, the application of the label may be completed for instance by conventional means, at a subsequent station of the machine to which the bottle or other article A is transported by the belt 12 or its equivalent.

While the description and drawings refer specifically to labeling and labeling mechanisms and operations, it is to be understood that it is the intention to include therein equivalent operation and mechanisms, and the specification and claims are to be accordingly construed even though the aforesaid specific terminology may be used in the specification and claims.

The novel mechanism is simple in construction and efficient in action without the necessity for any particularly skilled supervision on the part of an operator. The mechanism may be readily embodied in various types of labeling machines or combined with other mechanisms whereby equivalent operations are performed.

Various changes in the specific forms shown and described may be made within the scope of the claims without departing from the spirit of the invention.

I claim:

1. The combination of a support for an article, transfer means including spaced members arranged to occupy a label receiving position wherein the opposite ends of an adhesively coated label are temporarily connected with said members, means for operating said transfer means to transfer said label into applying relation to said article, and means movable into engagement with said label to disconnect the opposite ends thereof from the spaced members of said transfer means and to adhesively attach said label to said article.

2. The combination of a support for an article, transfer means including spaced members arranged to occupy a label receiving position at which an adhesive coated label is deposited on said transfer means to span the space between said members and with the opposite end portions of said label alone in temporary adhesive connection therewith, means for shifting said transfer means from said label receiving position to transfer said label into applying relation to said article, and means movable into engagement with said label between said members for withdrawing said adhesively connected end portions of said label from the members of said transfer means and for subsequently adhesively attaching said label to said article.

3. The combination of a support for an article, a shaft, carrying means fixed on said shaft, means for operating said shaft to adjust said carrying means to a label receiving position at which the opposite ends of an adhesive coated label are deposited on said carrying means in temporary adhesive connection therewith, and to shift said carrying means from said label receiving position to transfer said label into applying relation to said article, and means movable into engagement with said label for withdrawing said adhesively connected opposite ends of said label from said carrying means and for subsequently adhesively attaching said label to said article.

4. The combination of a support for an article, a rock-shaft, a pair of carrying members carried by said shaft in spaced parallel relation to each other, means for rocking said shaft in one direction to adjust said carrying members to a label receiving position at which an adhesive coated label is deposited on said carrying members with its opposite ends in temporary adhesive connection therewith, and for rocking said shaft and carrying members in a reverse direction to transfer said label into applying relation to said article, and means movable into engagement with said label for withdrawing said adhesively connected opposite ends of said label from said carrying members and for adhesively attaching said label to said article.

5. The combination of a support for an article, transfer means arranged to occupy a label receiving position at which a label is deposited on said transfer means, resisting means for said transfer means constituting a rest in said label receiving position to resist the developed label depositing forces, means for operating said resisting means to release said transfer means, means for operating said transfer means subsequent to said release to transfer said label into applying relation to said article, and applying means for removing said label from said transfer means and applying it to said article.

6. The combination of a support for an article, a rock-shaft, a pair of carrying members carried by said shaft in spaced parallel relation to each other, means for rocking said shaft in one direction to adjust said carrying members to a label receiving position at which an adhesive coated label is deposited on said carrying members with its opposite ends in temporary adhesive connection therewith, and for rocking said shaft and carrying members in a reverse direction to transfer said label into applying relation to said article, a movable supporting rail adapted to lock said carrying members in the label receiving position to resist the developed label depositing forces, means for shifting said rail to release said carrying members, and applying means for withdrawing said adhesively connected label from said carrying members and applying it to said article.

7. The combination of a support for an article, a rock-shaft, a pair of carrying members mounted on and projecting radially from said shaft in spaced parallel relation, a toothed segment carried by said shaft, a toothed rack in operative engagement with said segment, means for operating said rack to rock said shaft and adjust said carrying members to a horizontal label receiving position at which an adhesive coated label is deposited on said carrying members with its opposite ends in temporary adhesive contact therewith, and for subsequently rocking said shaft to shift said carrying members to a vertical position with said label in applying relation to said article, and movable applying means arranged to develop a pressure on said label for withdrawing said adhesively connected ends of said label from said carrying members and for adhesively attaching said label to said article.

8. The combination of a support for an article, a rock-shaft, a pair of carrying members mounted on and projecting radially from said shaft, a toothed segment carried by said shaft, a toothed rack in operative engagement with said segment, means for operating said rack to rock said shaft and adjust said carrying members to a horizontal label receiving position at which an adhesive coated label is deposited on said carrying members with its opposite ends in temporary adhesive contact therewith, and for subsequently rocking said shaft to shift said carrying members to a vertical position with said label in applying relation to said article, a second rock-shaft, a supporting rail movable therewith and adapted to extend beneath the free ends of said carrying members to lock the latter in said label receiving position to resist the developed label depositing forces, a tripping member carried by said second shaft, mechanism, including a tripping rod, for acting on said tripping member to shift said supporting rail from beneath the ends of said carrying members to release the latter, and applying means for withdrawing the adhesively connected label from said carrying members and applying it to said article.

9. The combination of a support for an article, carrying means on which the opposite ends of an adhesive coated label are temporarily adhered whereby said label is supported in applying relation to said article, and movable applying means arranged to develop a pressure on said label for removing it from said carrying means and attaching said label to said article.

10. The combination of a support for an article, a stationary stop constituting a fixed abutment for said article label applying means, carrying means whereby an adhesive coated label is supported between said applying means and article in applying relation to the latter, and means for operating said applying means to developing a pressure on said label to remove the same from said carrying means and to subsequently adhesively attach said label to said article.

11. The combination of a support for an article, label applying means, including an applying device shaped to fit the surface contour of said article, carrying means with which an adhesive coated label may be in temporary adhesive contact and whereby said label may be supported between said applying device and said article in applying relation to the latter, means for operating said label applying means to shift said applying device toward said article to thereby withdraw said label from its temporary adhesive connection with said carrying means and to subsequently adhesively attach said label to said article, and a stationary stop engaging said article to resist the label attaching forces developed by said applying device.

12. The combination of a support for an article, pivoted carrying means with which an adhesive coated label is in temporary adhesive connection, said carrying means being pivotally movable from a label receiving position to a label applying position in which said label is in applying relation to said article, a label attaching device normally occupying an inoperative position outside of the operative path of said carrying means, and mechanism for shifting said label attaching device to an operative position in operative relation to said label and for actuating said device to remove said label from said carrying means and to adhesively attach it to said article.

13. The combination of supporting means for supporting an article in upright position, a pair of spaced carrying members for supporting an adhesive coated label and pivotally movable from a label receiving position to a label applying position in which said label is in vertical applying relation to said article, said label having its opposite ends in temporary adhesive connection with the respective carrying members, a reciprocable supporting slide, a label applying device movably mounted on said slide and normally occupying an inoperative position outside of the operative path of the label carried by said carrying members, means for shifting said labeling device to an operative position behind said label, and means for subsequently actuating said slide to shift said label applying device toward said article whereby said label is withdrawn from its adhesive connection with said carrying members and adhesively applied to said article.

14. The combination of supporting means for supporting an article in upright position, a pair of spaced carrying members for supporting an adhesive coated label and pivotally movable from a label receiving position to a label applying position in which said label is in vertical applying relation to said article, said label having its opposite ends in temporary adhesive connection with the respective carrying members, a reciprocable supporting slide, a labeling device pivotally mounted on said slide and normally occupying an inoperative position outside of the operative path of the label carried by said carrying members, means for shifting said labeling device to an operative position behind said label, means for subsequently actuating said slide to shift said labeling device toward said article whereby said label is withdrawn from its adhesive connection with said carrying members and adhesively applied to said article, and means for locking said labeling device against pivotal movement during the application of the label to the article.

15. The combination of supporting means for supporting an article in upright position, a pair of spaced carrying members for supporting an adhesive coated label and pivotally movable from a label receiving position to a label applying position in which said label is in vertical applying relation to said article, said label having its opposite ends in temporary adhesive connection with the respective carrying members, a reciprocable supporting slide, a label applying device movably mounted on said slide and normally occupying an inoperative position outside of the operative path of the label carried by said carrying members, means for shifting said labeling device to an operative position behind said label, means for subsequently actuating said slide to shift said label applying device toward said article whereby said label is withdrawn from its adhesive connection with said carrying members and adhesively applied to said article, and a stationary stop engaging said article to resist the label applying forces developed by said labeing device.

16. The combination of supporting means for supporting an article in upright position, a pair of spaced carrying members for supporting an adhesive coated label and pivotally movable from a label receiving position to a label applying position in which said label is in vertical applying relation to said article, said label having its opposite ends in temporary adhesive connection with the respective carrying members, a reciprocable supporting slide, a labeling device pivotally mounted on said slide and normally occupying an inoperative position outside of the operative path of the label carried by said carrying members, means for shifting said labeling device to an operative position behind said label, means for subsequently actuating said slide to shift said labeling device toward said article whereby said label is withdrawn from its adhesive connection with said carrying members and adhesively applied to said article, a stop movable with said labeling device and adapted to engage said supporting means to arrest the pivotal movement of said labeling device to its operative position without interference with the shifting of said labeling device toward said article, and a stationary projection co-operating with said stop to lock said labeling device against pivotal movement during the application of the label to the article.

17. The combination of supporting means for supporting an article in upright position, carrying means for supporting a label in vertical applying relation to said article, a reciprocable slide, an arm pivotally mounted on said slide, a labeling device carried by said arm and shaped to conform to the surface contour of said article, means for pivotally actuating said arm to swing said labeling device to and from its operative position and vice versa, and means for operating said slide to shift said labeling device relatively to said article to remove the label from said carrying means and apply it to said article.

18. The combination of supporting means for supporting an article in upright position, carrying means for supporting a label in vertical applying relation to said article, a reciprocable slide, an arm pivotally mounted on said slide, a labeling device carried by said arm and shaped to conform to the surface contour of said article, means for pivotally actuating said arm to swing said labeling device to and from its operative position and vice versa, means for operating said slide to shift said labeling device relatively to said article to remove the label from said carrying means and apply it to said article, and means for locking said arm against pivotal movement during the application of the label to the article 19. The combination of supporting means for supporting an article in upright position, carrying means for supporting a label in vertical applying relation to said article, a reciprocable slide, an arm pivotally mounted on said slide, a labeling device carried by said arm and shaped to conform to the surface contour of said article, means for pivotally actuating said arm to swing said labeling device to and from its operative position and vice versa, means for operating said slide to shift said labeling device relatively to said article to remove the label from said carrying means and apply it to said article, a stop on said arm arranged to engage said supporting means to arrest the pivotal movement of said label device toward its operative position, and a stationary projection co-operating with said stop to lock said arm against pivotal movement during the application of the label to the article.

20. The combination of supporting means for supporting an article in upright position, carrying means for supporting a label in vertical applying relation to said article, a pivotally movable and reciprocable labeling device, and mechanism for pivotally moving said labeling device into and out of operative relation with said article and for reciprocating said labeling device relatively thereto whereby said label is removed from said carrying means and applied to said article.

21. The combination of supporting means for supporting an article in label receiving position, carrying means with which opposite ends of an adhesive coated label are in temporary adhesive connection for supporting said lebel in applying relation to said article, a movable device, and mechanism for moving said device into operative relation with said supported label and for actuating said device to develop a pressure on said supported label whereby the adhesively connected ends of the latter are withdrawn from said carrying means and said label subsequently is adhesively attached to said article.

22. The combination of supporting means for supporting an article in label receiving position, movable carrying means arranged to occupy a receiving position in which an adhesively coated label is temporarily adhered thereon, means for actuating said carrying means to adjust said label into applying relation with said article, adjustable means for arresting the actuation of said carrying means to predetermine the applying relation of the label to the article, and movable means for exerting a pressure on said label to disconnect the latter from said carrying means and to subsequently attach said label to said article.

23. The combination of supporting means for supporting an article in upright label receiving position, movable carrying means including spaced, parallel members arranged to occupy a horizontal receiving position in which opposite ends of an adhesively coated label are deposited upon said members in temporary adhesive connection therewith, mechanism for operating said carrying means to adjust said members to a delivery position in which said label is located in applying relation to said article, an adjustable stop co-operating with said mechanism to predetermine the delivery position of said members and the applying relation of the label to the article, and means for exerting a pressure on said label to disconnect the opposite ends thereof from said members and to adhesively attach said label to said article.

GEORGE W. von HOFE.